W. A. CORBETT.
EGG BOILER.
APPLICATION FILED MAY 25, 1918.
1,387,357. Patented Aug. 9, 1921.
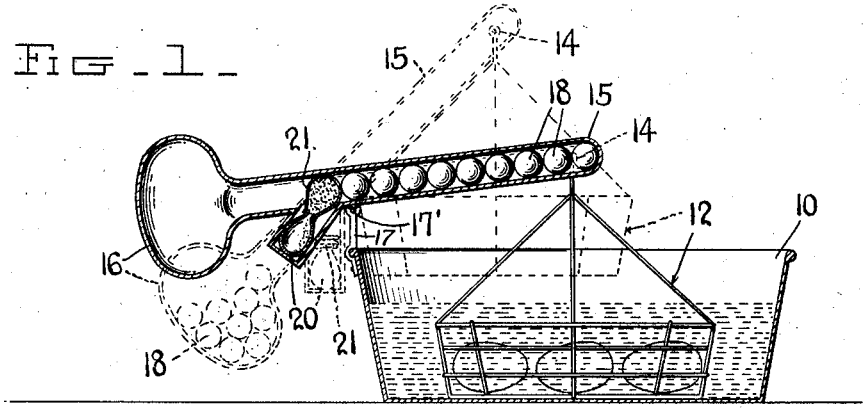
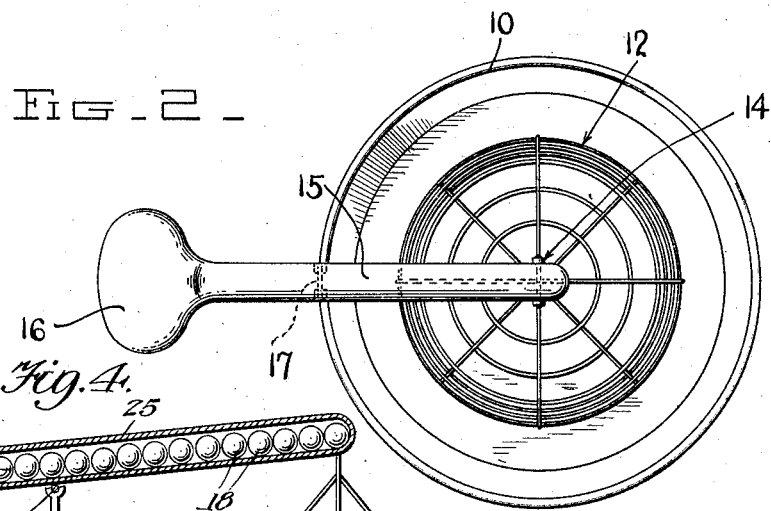
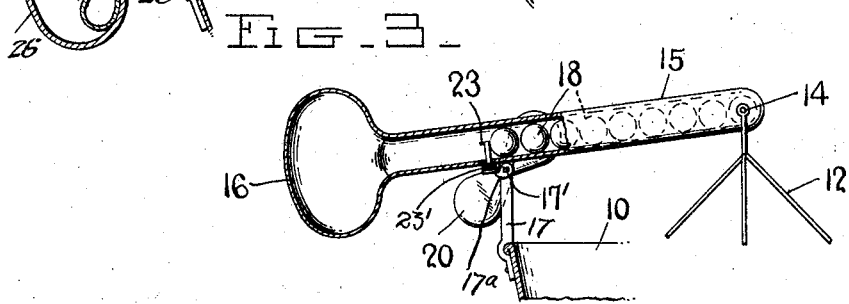
Witnesses
L. B. James
I. M. Burns
Inventor
W. A. Corbett
By Victor J. Evans
Attorney

UNITED STATES PATENT OFFICE.

WILLIAM A. CORBETT, OF WINNIPEG, MANITOBA, CANADA.

EGG-BOILER.

1,387,357.  Specification of Letters Patent.  Patented Aug. 9, 1921.

Application filed May 25, 1918. Serial No. 236,608.

*To all whom it may concern:*

Be it known that I, WILLIAM A. CORBETT, a citizen of the Dominion of Canada, residing at Winnipeg, in the Province of Manitoba and Dominion of Canada, have invented new and useful Improvements in Egg-Boilers, of which the following is a specification.

This invention relates to egg boilers, and the object is to provide a device of improved construction which will be more efficient than those heretofore employed for the purpose indicated.

A further object is to provide a device including a receptacle for the eggs, a pivotally mounted tubular member from which said receptacle is suspended, an hour-glass or the like carried by the pivotally mounted member, and a series of devices movable with reference to the pivotally mounted member after the expiration of a predetermined interval for tilting said member, and raising the receptacle for the eggs out of the water.

With the foregoing and other objects in view, the invention consists in the novel construction, combination, and arrangement of elements hereinafter described and claimed.

Figure 1 shows a cross section of applicant's device as applied to a vessel containing an egg basket.

Fig. 2 is a top plan view of the device and vessel.

Figs. 3 and 4 show further modifications of the device.

A suitable cooking utensil such as a saucepan is designated 10, and positioned therein is a receptacle 12, which may be formed of wire mesh, or the like, and which is suspended as shown at 14, from a pivotally mounted device 15, of tubular formation. This device 15, may be provided with a hollow handle member 16, and may be supported as shown at 17', by a bracket or the like, or a plurality of brackets, 17, resting on the edge of the receptacle and permitting of the tilting of member 15.

A plurality of balls are shown at 18, these balls being carried by the tubular member 15, and being of lead or the like, and adapted to slide toward the handle 16 at a given time for depressing the outer end of the tubular member, and raising the receptacle 12 out of the water.

A sand glass includes a lower bulb 20, and upper collapsible bulb 21, the latter being in the path of the balls 18, and retaining these balls in the right hand end of the tubular member 15, until the sand has passed into the bulb 20, when the member 15 being unobstructed, will permit the balls to roll toward and into the hollow handle 16, and raise the receptacle out of the water.

In another form of the device the sand glass may be pivoted near the center, so that when the sand has run out of one of the bulbs it will release the catch 23, and thereby release the balls 18.

The catch 23 comprises a pin encircled by coiled spring 23' which tends to throw the pin outwardly and downwardly into inoperative position. The pin is held in operative position by means of a catch 17ª on the pivot 17', and partly rotatable when the bulb moves by gravity after the sand has run out of the upper bulb. This form is shown in Fig. 3, and in Fig. 4 I have shown tube 25 provided with a hollow handle 26 closed by a cap 27 and containing a sand receptacle 30 having an upper portion 29 of rubber. Portion 29 is collapsible after the sand passes out and permits balls 18 to pass into the hollow handle, member 25 then tilting on its pivot 28, as in the other form.

The drawings show the element 26 as being offset from the tube, providing an abrupt descent for the balls, thereby producing direct action. The same remark applies to element 16.

What is claimed is:

1. In a device of the class described, a receptacle, a tubular member mounted for pivotal movement, said receptacle being connected with the tubular member, a plurality of weighted members within the tubular member, a hollow, flexible, and collapsible time measuring device constituting an obstruction, retaining the weighted members in one end of the tubular member, and permitting them after the expiration of an interval to move to the opposite end, for overbalancing the latter.

2. In a device of the class described, a receptacle, a tubular member mounted for pivotal movement, said receptacle being connected with the tubular member and offset therefrom, a plurality of weighted members within the tubular member, the offset portion providing an abrupt descent for the weighted members, and a time measuring device including an element constituting an obstruction for the weighted members, permitting them to make the aforesaid abrupt descent, upon the expiration of a given interval.

In testimony whereof I affix my signature.

WILLIAM A. CORBETT.